Figure 1:
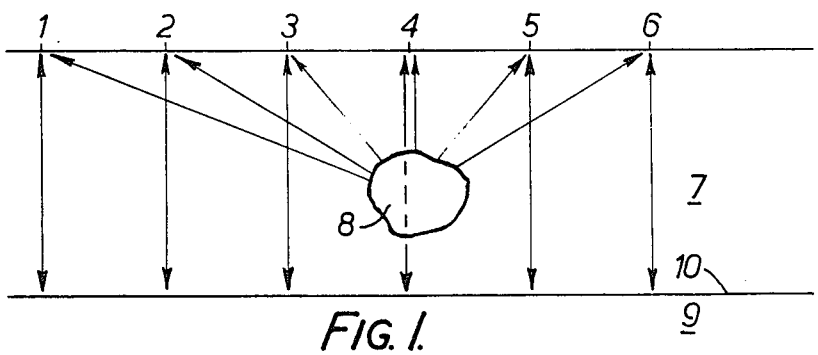

United States Patent [19]

Howell

[11] 4,006,445
[45] Feb. 1, 1977

[54] APPARATUS FOR AND METHODS OF SEISMIC PROSPECTING

[75] Inventor: Mark Ian Howell, Bristol, England

[73] Assignee: Electrolocation Limited, Bristol, England

[22] Filed: Nov. 3, 1975

[21] Appl. No.: 628,429

[52] U.S. Cl. .............. 340/15.5 TC; 340/15.5 TG; 346/33 C

[51] Int. Cl.[2] .......................................... G01V 1/26

[58] Field of Search ............ 340/15.5 TC, 15.5 JD, 340/15.5 TG, 6 M, 7 PC, 147 SY; 346/33 C

[56] References Cited

UNITED STATES PATENTS 2,956,261  10/1960  Grossling ..................... 340/15.5 F
3,293,596  12/1966  Paterson et al. ................. 346/33 C

FOREIGN PATENTS OR APPLICATIONS 1,592,555  6/1970  France ................................. 175/40

OTHER PUBLICATIONS

Gaugh, "A New Instrument for Seismic Exploration at Very Short Ranges," 4/52, pp. 311–333, Geophysics, vol. 17, No. 2.

Primary Examiner—Nelson Moskowitz
Attorney, Agent, or Firm—Young & Thompson

[57] ABSTRACT

In seismic prospecting a local response is achieved by striking a hammer on the ground, and the recording apparatus is arranged to be triggered by the hammer to run from a short time before the impulse to a predetermined time after it. The impulse is recorded into one channel and the reflections into another, and the latter are slowed down by successive recordings to a speed where they can be mechanically plotted. The impulse signal in the other channel is used as a timing and control signal for the re-recording and playbacks.

16 Claims, 7 Drawing Figures

APPARATUS FOR AND METHODS OF SEISMIC PROSPECTING

This invention relates to apparatus for and methods of seismic prospecting. It is particularly concerned with a method of seismic prospecting of the kind wherein impulses are imparted into the ground over a selected area in a selected pattern and reflection data are collected by at least one geophone in the immediate neighbourhood of each shot point (i.e. impulse location). The method will generally be carried out with a single geophone and a single shot or impulse at each point, the results of which are recorded in series on tape.

According to one aspect of the present invention there is provided a method of seismic prospection wherein the subterranean response from a single generated impulse is recorded into two channels, the first channel providing datum information, i.e., a signal corresponding to said impulse, and the second channel providing signals corresponding to reflections of said impulse, wherein the played back second channel signals are re-recorded in a continuation of the second channel, and the played back impulse signal from the first channel is used to initiate said re-recording and switch into a continuation of the first channel a continuous tone which is recorded as a tone burst simultaneously with the re-recording of the second channel signals, and wherein the re-recorded second channel signals are played back with the tone burst and visual signals are made from the played back re-recorded second channel signals over the period of said burst, each play back being made at equal or slower speed than the associated recording.

In the preferred form, this method involves the following steps. The output of a transducer or sensor attached to the impulse generator (e.g. a hammer) is fed to a multivibrator which produces an output pulse simultaneous with the hammer impact instant. This pulse is recorded on a first, field tape recorder, in the first channel. The output of a geophone at the sounding point is fed to the second channel of the field tape recorder. The field tape recorder is run for a pre-set time at a first, fast speed when recording each impulse and its result in sequence. It is then replayed continuously at an equal or slower speed and the two channel outputs are directed to a further tape recorder. The first channel carrying a signal corresponding to the initial hammer blow provides a large pulse which is used to start the second recorder and after a short delay to cut in an oscillator which applies a continuous tone for a predetermined period to the first channel input of the second recorder. At the end of a predetermined time after the hammer blow pulse the second recorder stops. The second channel output of the first recorder is fed to a second input of the second recorder via a Schmitt trigger and differentiator. The latter channel thus records a series of pulses corresponding to each seismic motion of the geophone. This is done at a first, fast speed and the recording is then replayed at a second, slow speed to give a second channel output that can be traced mechanically, having been slowed down by the order of up to fifty times relative to the original speed.

The impulse at the next shot point recorded and played back in the same way produces another trace, following the first one after a brief interval.

In this method, data from remote strata may be subject to more powerful amplification than data from regions near the geophone and it may be convenient to short-circuit the output of the geophone for a brief period, one millisecond for example, at the moment of the hammer blow to prevent excessive modulation of a subsequent amplifying channel. Alternatively the geophone diaphragm may be electromagnetically damped during this brief period.

The two channel outputs of the second recorder can be employed to operate the digital plotter which forms the subject of U.S. Pat. No. 3,707,002.

According to another aspect of the present invention there is provided apparatus for use in performing this method, comprising a first two-channel tape recorder, a second two-channel tape recorder, each of which can record at one speed and play back at a slower speed, a continuous frequency generator, first means for switching on said first recorder to record said impulse and reflection signals on respective channels, second means responsive to the playback of the impulse signal in the first channel of the first recorder for switching on said second recorder to record on both channels and to switch into the first channel of said second recorder the output of said continuous frequency generator, the second channel of the second recorder serving for the recording of played back signals from the second channel of the first recorder, and means for forming visual traces from the played back second channel output of the second recorder responsive to the first channel output of that recorder to be operative while said continuous frequency obtains.

Figure 2:
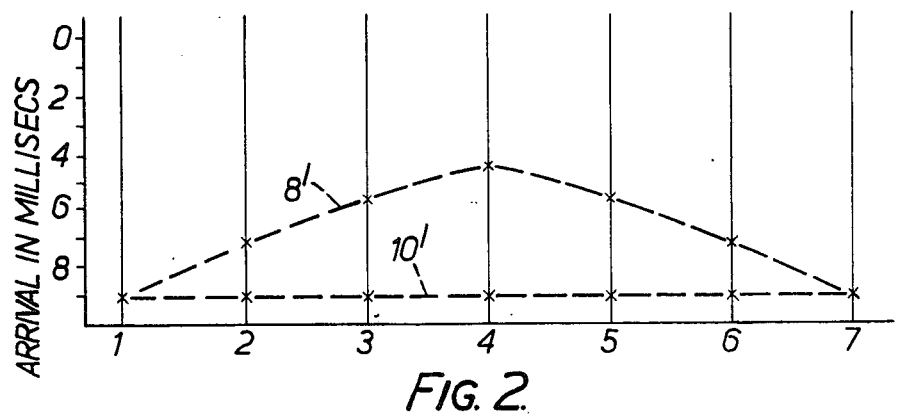
Figure 3:
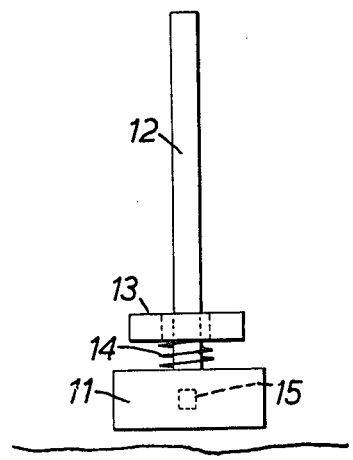
Figure 4:
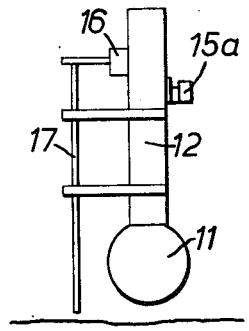
Figure 5:
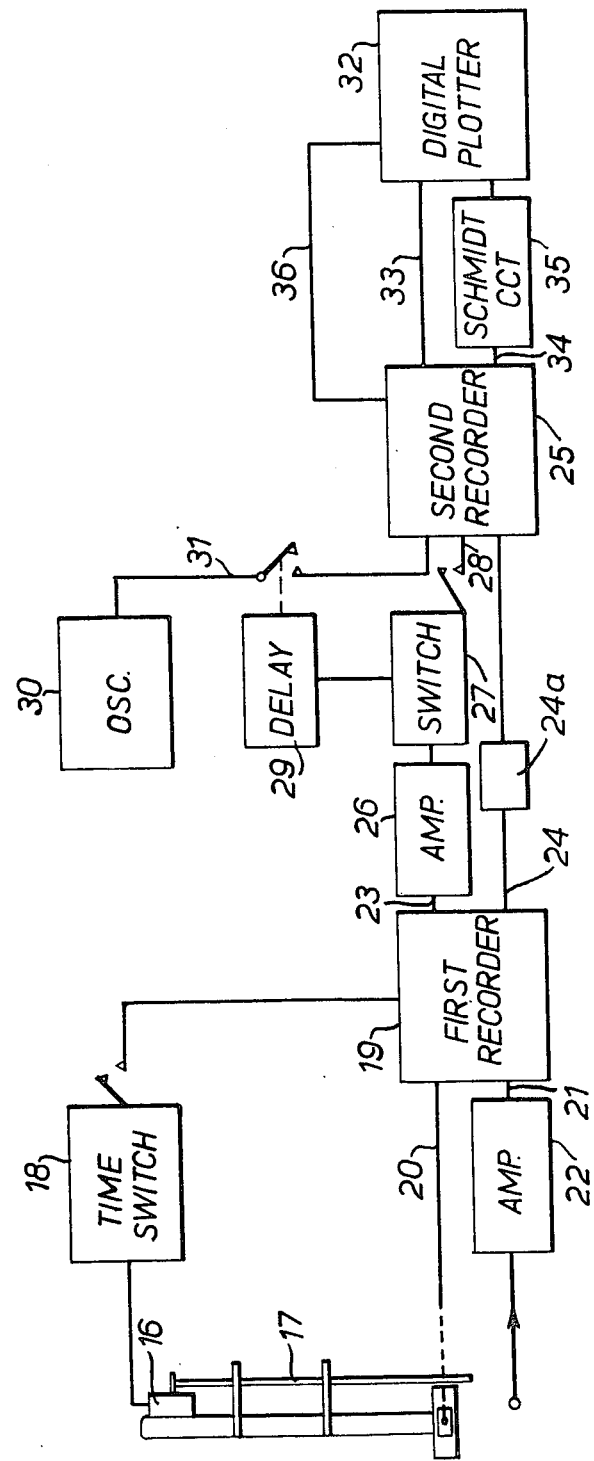
Figure 6:
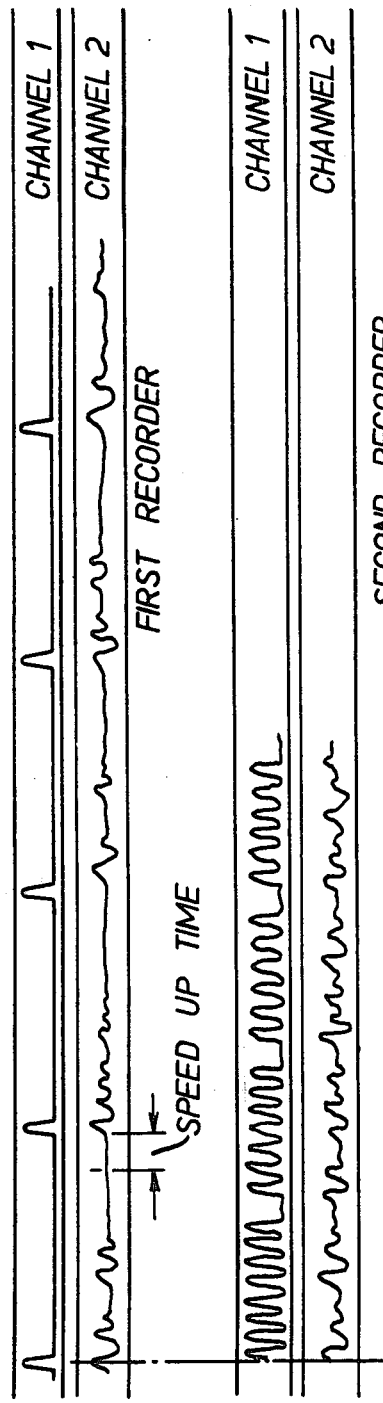
Figure 7:
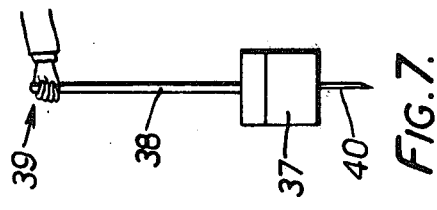

The invention may be performed in various ways and some constructional forms thereof will now be described by of example, with reference to the accompanying drawings, in which:

FIG. 1 is a diagrammatic vertical-section through an area of ground near the surface, FIG. 2 is a graph diagrammatically illustrating traces obtainable from seismic shots over the ground of FIG. 1, FIG. 3 is an elevation of an impulse generator, FIG. 4 is an elevation of a switching device applicable to the generator of FIG. 3, FIG. 5 is a circuit diagram of seismic trace recording apparatus, FIG. 6 shows wave forms associated with the circuit of FIG. 3 and FIG. 7 is an elevation of a geophone device.

Referring to FIG. 1, there are shown six sounding points referenced 1 to 6 equispaced along a line on the surface of the ground. Near this surface the ground consists of an upper stratum 7 having a cavity 8 and a lower stratum 9 having an interface 10 with the stratum 7.

An impulse or sounding at point 1 will result in two reflections, one from the interface 10 and the other from the cavity 8. A sounding at the other points will likewise produce two reflections, but the nearer the cavity 8 the shorter the interval between the sounding and the reflection of it from that cavity, while the reflection time from the interface 10 will remain constant. When plotted as shown in FIG. 2 with arrival time in milliseconds against the spacing of the sounding points, a straight line 10' will indicate the interface 10 and the apex of a substantially parabolic line 8' will indicate the position of the cavity 8, and its depth. The collation of results of soundings from points along a line, or in a grid, thus enables it to be determined where local irregularities exist, and to distinguish them from continuous interfaces.

A suitable impulse generator for small energy seismic waves is shown in FIG. 3. The generator has a hammer head 11 and an upstanding shaft 12 on which slides a massive collar 13. A spring 14 is interposed between the collar 13 and the upper face of the head 11 and a geophone transducer 15 is buried within the head 11. The electrical connections thereto are not shown, but may be taken out through the shaft 12 or laterally from the head 11. The hammer is manually operated by a surveyor holding the upper end of the shaft 12.

When the hammer head 11 is struck against the ground a seismic wave is produced. The massive collar 13, by virtue of its inertia, will cause the spring 14 to exert a pressure against the hammer head after contact with the ground has been made. The period of continued contact will be dependent on the nature of the spring system and the inertia of the collar, but will be of the order of 50 to 100 milliseconds. The transducer 15, being effectively firmly in contact with the ground during this period, will pick up reflection data generated by the seismic wave, which may be recorded on tape.

In order to avoid distortions, the tape recorder by which the seismic signals are to be recorded should be switched on shortly before the generation of the seismic impulse. This may be achieved by the attachment of the device shown in FIG. 4, where there is mounted on the shaft 12 of a hammer without a spring supported collar (it resembles a simple rammer or punner) a microswitch 16 arranged to be actuated by a vertical sliding rod 17 which projects below the hammer head 11 before the latter strikes the ground. The rod 17 will therefore be forced upwardly relatively to the shaft 12 before the seismic impulse is generated and will actuate the microswitch 16. This is used to switch on the tape recorder. The interval between the rod 17 and the hammer head 11 hitting the ground may be of the order of 10 to 100 milliseconds and this is sufficient for the tape to have run up to full speed by the time the hammer head strikes the ground. The tape is run at its full speed for a predetermined period, say 300 to 400 milliseconds from the initial movement of the sliding rod 17. This is sufficient to record all seismic activity within a given range.

This hammer, without the spring-borne collar, has the main geophone separate, and one such geophone arrangement will be described below with reference to FIG. 7. However, a signal from the hammer indicating the instant it strikes is still required, and therefore the hammer of FIG. 4 has a transducer 15a attached rigidly to the shaft 12. This produces an output signal transient when the hammer strikes the ground.

The entire result of a single sounding is recorded on tape and the apparatus described below makes possible rapid gathering and display of data so recorded. It will be understood that, in order to forestall distortions, the geophone at the sounding point may be rendered ineffective at the moment of the initial impulse, either by short circuiting the output or by electromagnetic damping over a period of say one millisecond.

Referring now to FIG. 5, there is shown a circuit for processing the signals obtained from a seismic impulse. The microswitch 16 governs through a time switch 18 the record period of a first tape recorder 19. The latter has two channels, one channel input 20 being fed from the transducer 15a on the hammer via a multivibrator 20a and the other input 21 being from the main geophone, possibly via an amplifier circuit 22. This amplifier circuit 22 if employed increases its gain according to a square law from the time of the initial impulse. The recording of both channels is made at an initial fast speed, for example 7 inches per second (7 i.p.s.) and followed by playback at a slow speed, for example 15/16 i.p.s. The first channel input 20 gives a large pulse corresponding to the initial impulse and the second channel input 21 gives a trace corresponding to the reflected data. The amplifier 22, if employed, compensates to a large extent for the weakness of signals from remote points in the ground.

The recorder 19 has two corresponding channel outputs 23 and 24 for the slow playback. The second channel output 24 for the trace signal is fed via a Schmitt trigger and differentiator circuit 24a to a corresponding input of a second tape recorder 25. The first channel output 23 is applied through an amplifier 26 to a switch control unit 27 which has a switch output 28 for starting and stopping the recorder 25 so that it will run for periods corresponding to the recording periods of the first recorder (set by the time switch 18), and another output to a delay unit 29. An oscillator 30 that produces a continuous tone of 10 kHz, for example has a switched output 31 to the first channel input of the recorder 25, governed by the delayed output of switch unit 27. The delay of the unit 29 is of the order of 10 milliseconds to create gaps in the tape tone recorded in the first channel of recorder 25. The separated tone bursts are used to trigger the other channel playback periods in synchronism with revolutions of the drum of the plotter described in U.S. Pat. No. 3,707,002.

Recorder 25 also records at a first fast speed of, for example, 7 i.p.s. and plays back at a slow speed, for example 15/16 i.p.s. Its two channel outputs 33 and 34 are fed to a digital plotter 32 such as that described in U.S. Pat. No. 3,707,002. The first channel output 33 gives a continuous tone signal for a predetermined period while the second channel output 34 provides the reflection data still further "spread" in time. This output 34 leads directly, or via a Schmitt trigger and spike generating circuit 35 if the equivalent circuit 24a is omitted, to the plotter pen circuit so that the trace signal is applied to the digital plotter second channel input in pulsed form. It is preferred to have the Schmidt trigger circuit in the second channel between the two recorders in order to extend the range of seismic frequencies to which the plotter will respond. The movements of the plotter and the operation of the recorder 25 are synchronised through the line 36.

The circuit operates as follows. An impulse generator, for example a hammer such as that described above, is actuated and before the hammer head hits the ground the microswitch 16 triggers the time switch 18 to start the recorder 19. This is running at its proper fast speed when the hammer head hits the ground. A single large pulse generated by the multivibrator 20a, carried for example in the operator's belt pack, is recorded in the first channel through input 20 and a recording of the seismic trace (which may be amplitude compensated) is made in the other channel through input 21. The recorder 19 is stopped after an interval governed by the switch 18, for example 400 milliseconds after the switch 18 is first actuated, which is equivalent to 350 milliseconds after the hammer head has hit the ground. Subsequent playback at slow speed with outputs to the channels 23 and 24 results in the switch control unit 27 being actuated to start the recorder 25 at an instant corresponding to the initial seismic impulse. The second channel output of the first recorder 19 is fed to the Schmitt trigger and differentiator 24a and thence in the form of "spikes" for each recorded seismic reflection to the second channel input of the second recorder 25. After a delay of 10 milliseconds, for example, the output of the oscillator 30 is switched to the first channel of the second recorder 25 and a continuous tone burst is recorded for a length of time corresponding to the length of the trace.

The tape of recorder 25 is then played back at slow speed and the pulsed output of the second channel is applied to the digital plotter which reproduces mechanically a trace corresponding to the electronically recorded one. The tone burst in the first channel operates a switch in the digital plotter which causes the tape to continue running and the intervals between bursts are used to stop the tape recorder and to move the recording pen or marker to new relative positions for the recording of the next trace.

FIG. 6 shows diagrammatic examples of the inputs and outputs to and from both channels of the two recorders.

It may in some circumstances be possible to playback a tape at the same speed as a recording, of the ground near the point where the hammer of FIG. 4 is used is shown in FIG. 7. The geophone is in a housing 37 at the bottom of a handle 38 which is grasped near the top at 39 by an operator. The housing has a downwardly projecting spike 40 which is held against the ground surface and which will transmit vertically ascending plane waves to the geophone. However, transverse waves that may be present in the ground will not be transmitted; neither will slight lateral movement of the handle by the operator.

I claim:

1. A method of seismic prospection wherein the subterranean response from a single generated impulse is recorded into two channels the first channel providing datum information, i.e., a signal corresponding to said impulse, and the second channel providing signals corresponding to reflections of said impulse, wherein the played back second channel signals are re-recorded in a continuation of the second channel, and the played back impulse signal from the first channel is used to initiate said re-recording and switch into a continuation of the first channel a continuous tone which is recorded as a tone burst simultaneously with the re-recording of the second channel signals, and wherein the re-recorded second channel signals are played back with the tone burst and visual tracings are made from the played back re-recorded second channel signals over the period of said burst, each play back being made at an equal or slower speed than the associated recording.

2. A method as claimed in claim 1, wherein the second channel signals are transformed into pulses before or after re-recording.

3. A method as claimed in claim 1, wherein the switching of said continuous tone into the first channel is delayed in relation to the impulse signal.

4. A method as claimed in claim 1, wherein the first recording process is triggered to commence immediately before said impulse.

5. A method as claimed in claim 4, wherein the first recording process is continued for a first predetermined period.

6. A method as claimed in claim 5, wherein the re-recording process is continued for a second predetermined period corresponding to said first period.

7. A method as claimed in claim 1, wherein reflection data from remote strata are amplified to a greater extent than reflection data from strata nearer the surface of the ground.

8. A method as claimed in claim 1, wherein the output of a geophone which receives the impulse reflections is blocked at the moment of the impulse.

9. Apparatus for processing a subterranean seismic response including impulse and reflection signals, comprising a first two-channel tape recorder, a second two-channel tape recorder, each of which can record at one speed and play back at a slower speed, a continuous frequency generator, first means for switching on said first recorder to record said impulse and reflection signals on respective channels, second means responsive to the playback of the impulse signal in the first channel of the first recorder for switching on said second recorder to record on both channels and to switch into the first channel of said second recorder the output of said continuous frequency generator, the second channel of the second recorder serving for the recording of played back signals from the second channel of the first recorder, and means for forming visual traces from the played back second channel output of the second recorder responsive to the first channel output of that recorder to be operative while said continuous frequency obtains.

10. Apparatus as claimed in claim 9, wherein means for transforming the seismic reflection signals into pulsed signals are disposed in said second channel of the second recorder.

11. Apparatus as claimed in claim 9, wherein means for delaying the switching of said continuous tone into said first channel are governed by said second switch means.

12. Apparatus as claimed in claim 9, wherein said first switch means includes a sensor associated with impulse generating means and arranged to give a "switch on" signal immediately before an impulse.

13. Apparatus as claimed in claim 12, wherein said first switch means includes a time switch governed by said sensor and adapted to maintain said first recorder on for a first predetermined period following the signal from the sensor.

14. Apparatus as claimed in claim 13, wherein said second switch means includes a time switch governed by the first channel output of said first recorder and adapted to maintain said second recorder on for a second predetermined period corresponding to said first period.

15. Apparatus as claimed in claim 9, wherein an amplifier is provided in said second channel of said first recorder and is adapted to increase its amplification with time over the recording period.

16. Apparatus as claimed in claim 9, including a geophone for receiving impulse reflections destined for the second channel of said first recorder and means for blocking the output of said geophone at the moment of each impulse.

* * * * *